Feb. 26, 1929.  
S. F. TRIPLETT  
1,703,123  
GRAPE STEMMING DEVICE  
Filed March 28, 1927   2 Sheets-Sheet 2

INVENTOR  
S. F. Triplett  
BY  
ATTORNEY

Patented Feb. 26, 1929.

1,703,123

UNITED STATES PATENT OFFICE.

STANLEY F. TRIPLETT, OF CERES, CALIFORNIA, ASSIGNOR TO PACIFIC GRAPE PRODUCTS COMPANY, OF CERES, CALIFORNIA, A CORPORATION OF CALIFORNIA.

GRAPE-STEMMING DEVICE.

Application filed March 28, 1927. Serial No. 178,864.

This invention relates to devices for removing stems from grapes, especially of the Thompson seedless variety, and particularly represents improvements over the structure for this purpose shown in my Patent No. 1,526,573, dated February 17th, 1925.

The principal object of the present invention is to provide a stemming apparatus for the purpose having improved features over what is shown in said patent, so as to enable stemming operations to be more thoroughly and efficiently carried out; and to provide in addition a cooperating mechanism for enabling small clusters of grapes, connected together by common branched stems, to be broken up and separated from each other before the grapes pass to the stemming device, so that each grape and its stem is in proper condition to be acted on by said stemming device.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
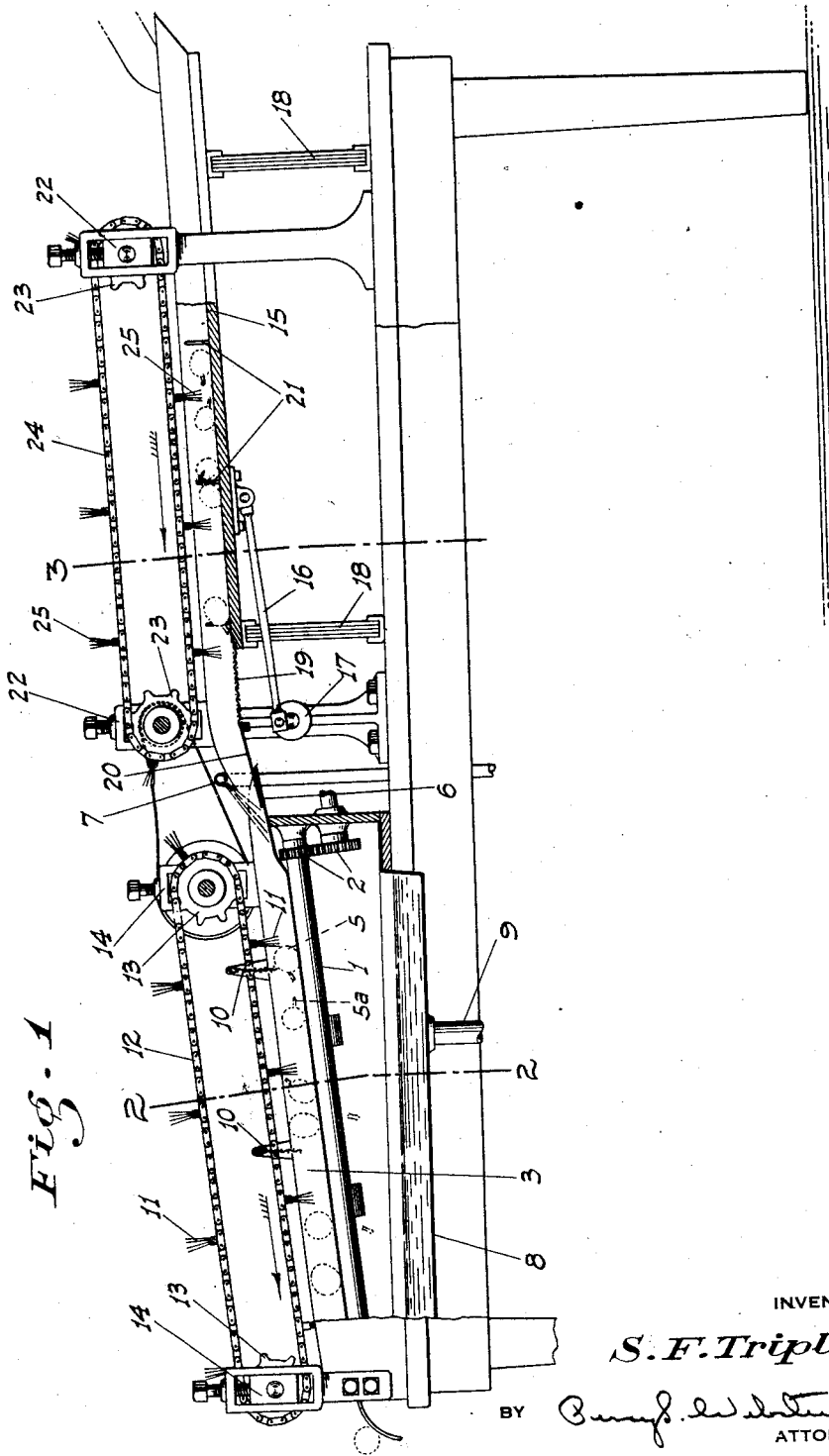
Fig. 1 is a sectional elevation of my improved cluster breaking and grape stemming apparatus.
Figure 2:
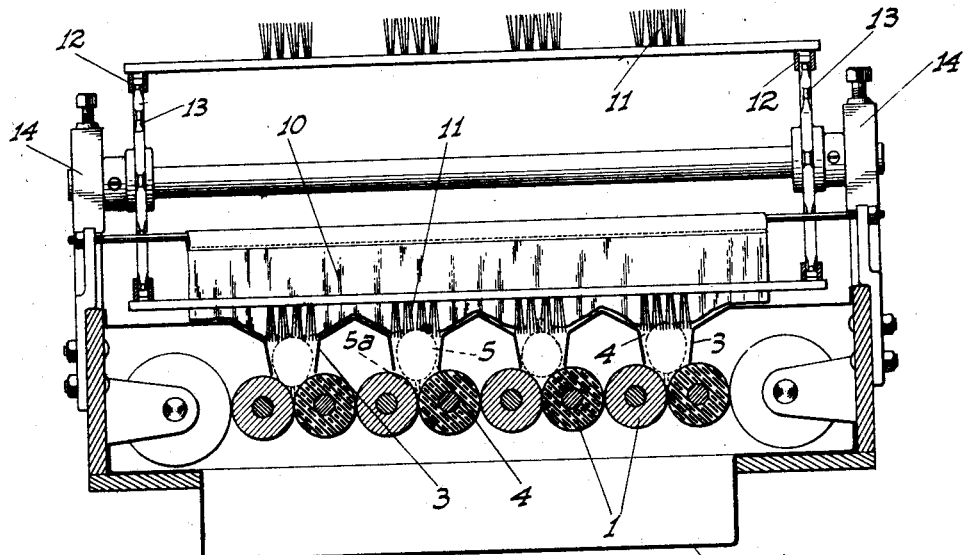
Fig. 2 is a cross section of the stemming unit taken on the line 2—2 of Fig. 1.
Figure 3:
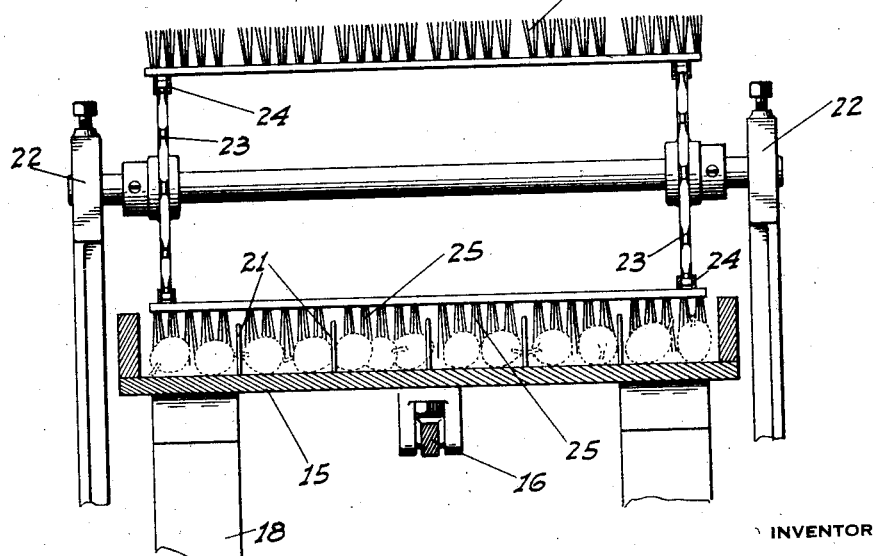
Fig. 3 is a cross section of the separating unit taken on the line 3—3 of Fig. 1.

Referring now more particularly to the characters of reference on the drawings, the numeral 1 denotes a plurality of transversely alined and relatively long rollers, contacting with each other and preferably made of rubber and steel alternately. These rollers are driven from one end in any suitable manner such as by gearing 2 so that the upper faces of alternate pairs of rollers turn toward each other so as to form stem engaging and gripping elements. Upstanding partition members 3 extend lengthwise of the rollers above the same, the partitions being located in transversely spaced relation so as to form guide troughs 4 for the passage of the grapes lengthwise of and between its rollers whose faces turn toward each other as above stated.

The rollers and partitions are set at a certain slope from the receiving to the discharge end so that the grapes 5 will roll along the troughs and in so rolling the stems $5^a$ will sooner or later project between the adjacent faces of the rollers and will be pulled off and discharged below the rollers. The grapes rest directly on the rollers which are of small diameter so as to insure the relatively short stems projecting between the rollers a sufficient distance to be frictionally engaged. The partition structure at its upper end terminates in a transverse apron 6 from which a transverse water spray nozzle 7 discharges at a downward angle toward the upper end. In this manner a continuous flow of water moves along the troughs and rollers and keeps said rollers from becoming sticky. The water passing between the rollers is caught by a trough 8 thereunder into which the stems also drop; the water and stems being continuously carried away through a discharge pipe 9.

In order to aid in causing the grapes while rolling down the troughs being properly positioned so that the stems will pass between the rollers I provide a pair of vertical flexible curtains 10 extending across the partitions at longitudinally spaced intervals and projecting into the troughs 4 a sufficient distance to yieldably engage the upper surfaces of the grapes passing along said troughs. To dislodge any grapes which may jam in the troughs, I provide transverse flexible brushes 11 also arranged to project into the troughs somewhat so as to engage the grapes and mounted at longitudinally spaced intervals on endless chains 12. The chains are turnably mounted on sprockets 13 which are journaled in vertically adjustable bearings 14, so that the distance the brushes project into the troughs may be altered at will to suit different conditions. By means of the curtains, the grapes if necessary are disturbed or restrained somewhat during their travel lengthwise of the rollers so that their positions will be shifted in a manner to cause them to be positioned so that the stems will project between the rollers and thus be pulled off, while the brushes, pressing against any stuck grapes, will dislodge the same.

The device for breaking up small clusters of grapes, so that each grape and its stem will be a unit independent of other grapes when fed onto the apron 6 is constructed as follows:

Longitudinally alined with the stemming unit and ahead of and above the apron 6 is a table 15. This table is of the shaking or agitated type, the shaking movement being imparted thereto in any suitable manner such as by means of a longitudinal link 16 driven from an eccentric 17; the table being supported by spring or otherwise yieldable legs 18. The table and its end adjacent the stemming unit has a bottom of screening 19 beyond which is an apron 20 which overhangs the apron 6 somewhat but does not engage the same.

Projecting upwardly from the table at intervals are vertical pins or teeth 21 arranged in the form of longitudinal and transverse rows, the space between the teeth being such that at least one grape can freely pass therebetween. Mounted above the table on vertically adjustable bearings 22 are longitudinally spaced sprocket wheels 23 about which pass endless chains 24. Fixed on and extending between these chains at intervals are flexible brushes 25 positioned to clear the table but to engage the grapes thereon. These sprockets are arranged to be driven so that the lower runs of the chains travel toward the rear or apron end of the table.

In operation the grapes to be stemmed are first broken up from the large bunches into small clusters and are placed on the upper end of the table; the brush structure commencing some distance along the table so as to leave a space clear for the manual spreading of the grapes on the table if necessary. With the shaking of the table the grapes gradually move toward the lower end of the same and the branched stems of any grape clusters will sooner or later engage and be caught and held by the pins 21 projecting upwardly from the table. With the sweeping of the brushes against the held clusters the grapes will be forced along the table and pulled away from the stems or the latter broken apart, since said stems are held by the unyielding pins. The portions of the stems actually separated from the grapes soon clear themselves from the pins with the shaking of the table and will move lengthwise of the table until they drop through the screen 19. The individual grapes roll over the screen and onto the apron of the stemming unit and thence into the troughs, where said grapes are acted on for the removal of the stems if any in the manner previously recited.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A grape stemming device including a pair of transversely alined and downwardly sloping rollers engaging each other and arranged to be driven so that their upper faces turn toward each other, a longitudinal trough disposed centrally of and between the rollers to enable a grape to be supported by the upper faces of both rollers, and a fixed flexible curtain hung above the trough and depending thereinto a sufficient distance to engage a grape rolling down the trough.

2. A grape stemming device including a pair of transversely alined and downwardly sloping rollers engaging each other and arranged to be driven so that their upper faces turn toward each other, a longitudinal trough disposed centrally of and between the rollers to enable a grape to be supported by the upper faces of both rollers, and a water spray nozzle arranged to discharge into the trough at the upper end thereof.

3. In connection with a grape stemming unit, a shaker table mounted ahead of said unit and arranged to deliver onto the same, said table being arranged to receive clusters of grapes thereon at its head end, and means mounted in connection with the table for breaking up the clusters into individual grape and stem units by the time said grapes reach the delivery end of the table.

4. In connection with a grape stemming unit, a shaker table mounted ahead of said unit and arranged to deliver onto the same, said table being arranged to receive clusters of grapes thereon at its head end, pins projecting upwardly from the table to engage the crotches of branched stems, and means for engaging the grapes associated with such stems and breaking the grapes loose from the stems.

5. In connection with a grape stemming unit, a shaker table mounted ahead of said unit and arranged to deliver onto the same, said table being arranged to receive clusters of grapes thereon at its head end, pins projecting upwardly from the table to engage the crotches of branched stems, and a brush movable longitudinally in the direction of the delivery end of the table arranged to engage the grapes associated with such branched stems.

In testimony whereof I affix my signature.

STANLEY F. TRIPLETT.